Nov. 25, 1958  H. N. IPSEN  2,861,596
HEAT EXCHANGER BAFFLE SYSTEM
Filed Feb. 27, 1956
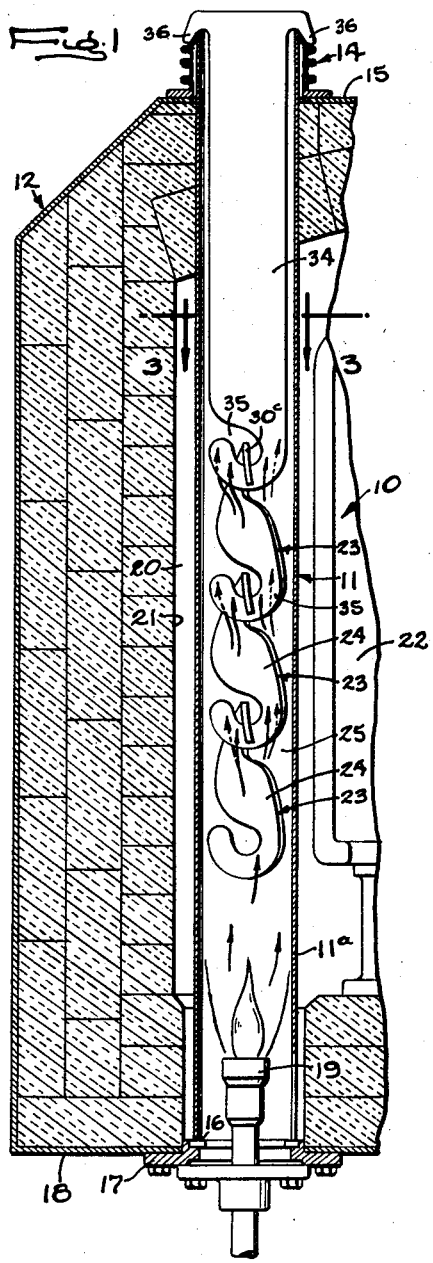
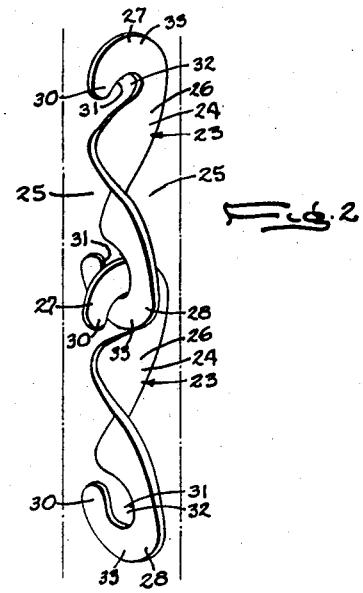
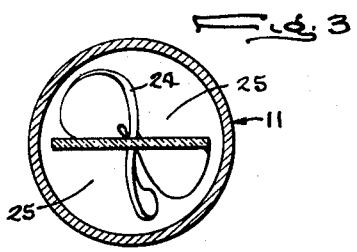
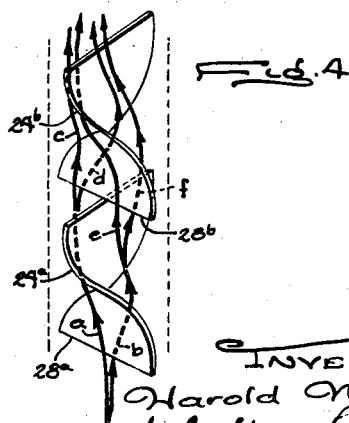
INVENTOR
Harold N. Ipsen
by Carlton, Pitzner,
Hubbard & Wolfe
ATTORNEY United States Patent Office 2,861,596
Patented Nov. 25, 1958

2,861,596

HEAT EXCHANGER BAFFLE SYSTEM

Harold N. Ipsen, Rockford, Ill.

Application February 27, 1956, Serial No. 568,032

4 Claims. (Cl. 138—38)

This invention relates to a baffle system for use within a heat exchanger tube of the type commonly used in heat treating furnaces and through which combustion products flow past the baffle system.

The general object is to provide a novel baffle system which produces great turbulence in the gas stream, which causes more efficient exchange of the heat to the wall of the tube, and which is simple to construct and assemble.

Another object is to provide a plurality of baffle elements disposed in contiguous end-to-end relation with the leading end portion of one baffle element contiguous to the trailing end portion of the next baffle element, and in a manner which causes the heated gases to flow in a succession of helical paths angularly spaced relative to each other about the axis of the tube thereby creating turbulence in the heated gases as they flow through the tube.

The invention also resides in the novel construction of the baffle elements.

Other objects and advantages of the invention will become apparent from the following detailed description taken in connection with the accompanying drawings, in which—

Figure 1 is a fragmentary sectional view taken along the longitudinal center line of the heat treating furnace.

Fig. 2 is a detailed view of two of the baffle elements.

Fig. 3 is a fragmentary sectional view taken along the line 3—3 of Fig. 1.

Fig. 4 is a diagrammatic view of two of the elements.

In the embodiment shown in the drawings for purposes of illustration, the improved baffle system indicated generally at 10 is mounted within an upright heat exchange tube 11 utilized within a heat treating furnace 12. The upper tube end 13 is affixed to an expansion bellows 14 mounted on the furnace top wall 15 and which holds the tube with its lower end resting on a seat 16 clamped in place by a ring shaped casting 17 secured to the furnace underside 18. Heated gases, which are the combustion products of a burner 19 clamped to the casting 17, rise upwardly within and heat the tube wall 11ª, the heated tube in turn transferring heat to the heat treating atmosphere circulated through a space 20 surrounding the tube and between the furnace side wall 21 and a heating chamber 22.

In moving through such a tube not provided with baffles which produce turbulence in the heated gases flowing through the tube, the heated gases tend to form a smooth flowing column with the portions of the gas nearest the tube wall 11ª being cooled by the tube before moving very far. Even though the gases within the core of the moving column may be very hot, the cooled outer portions tend to remain against the wall 11ª so that there is a poor transfer of heat from the core to the tube wall and the upper part of the tube remains cooler than the lower part which first is contacted by the gases.

In accordance with the invention, the baffle system 10 comprises a plurality of baffle elements 23 which cooperate in a novel manner to successively break up the core of the moving gas column, thereby creating a great amount of turbulence in the gases so that, as the gases move through the tube 11, the cooled outer portions of the column are replaced by hotter gases from within the core. To this end, a plurality of elongated strips 24, preferably each of uniform width throughout the length thereof and of a width slightly less than the internal diameter of the tube 11, are arranged in contiguous end-to-end relation and each strip is twisted longitudinally to define helical passages 25 (Fig. 2) along opposite side walls 26 of the strips. The individual strips are joined together with the leading and trailing end portions of contiguous strips angularly displaced relatively to each other about the axis of the tube so that each helical gas stream, as it passes from the trailing edge of one strip to the leading end portion of the contiguous strip, is intercepted and is split longitudinally and deflected in different directions. Thus, the trailing end portion 27 of each strip is angularly displaced with respect to the leading end portion 28 of the next contiguous strip. The leading end portions 28 successively intercept the moving gases as they pass from one strip to the contiguous strip, and the strip side walls 26 in turn deflect different portions of the gas along different helical paths.

Preferably, the strips 24 are of a temperature resistant ceramic material and are of uniform width and thickness, the width being chosen to be slightly smaller than the internal diameter of the tube 11. A suitable die (not shown) may be utilized to cut the individual strips from a sheet of the material while the latter is in a softened state and lying on a deformable backing. The backing then is twisted to form the desired twist in the strips, after which the strips are hardened by baking in a furnace. Herein, each of the strips 24 is twisted 90 degrees to dispose its end portions at right angles with each other.

While the strips 24 may be mounted in various ways, as by affixing them to the tube 11 either as a unit or individually, in accordance with a detailed aspect of the invention, hooks 30 rigid with the strip end portions are shaped to interlock with one another and are disposed so that, as an incident to interconnecting the strip and suspending the same from the upper tube end 13, the adjacent leading and trailing ends 28 and 27 assume the desired angularly displaced relation with respect to each other and with respect to the axis of the tube. Each hook 30 is formed by cutting a slot 31 laterally into the strip from one side thereof and enlarging the inner portion of the slot to form a central recess 32 opening through the end portion. The very outer end portion of the strip, beyond the recess 32, forms the closed end 33 of the hook 30 with the hook lying along the axis of the strip. Then, when the strips 24 are hooked together, the hooks 30 lie in intersecting angularly displaced planes including the common axis of the strip and the very act of interlocking the hooks disposes the helical passages in the desired successively offset relation.

For suspending the strips 24 from the tube end 11ª, the terminal hook 30ᶜ on the uppermost strip is connected to a hanger 34. Herein, the hanger 34 is a long thin strip of ceramic material with a hook 35 at one end formed in the same manner as hooks 30. At its other end, lateral projections 36 are bent downwardly to hook over the tube end 11ª.

While the path which a particular portion of the gas will take past the elements 22 varies with different relative sizes of the components, temperatures and velocities of the gases, and adjustments of the burner 19, Fig. 4 affords a diagrammatic illustration in which the various arrows represent assumed particular paths, that is, the paths of particular portions of the fluid.

In Fig. 4, the lowermost leading end portion 28ª first intercepts the upwardly rising gases and cuts across the core to split the gases into two parts $a$ and $b$. Each of these two parts then is deflected by the lower strip 24ª along two concentric helical passages. Although the disruption in the gas flow at this point creates turbulence and causes inner portions of the gas to be thrown against the tube walls to displace previously cooled gas portions, the gas soon tends again to assume a smooth flow. But before this happens to any extent, the gas is again intercepted, by the next leading end portion 28ᵇ, and the next strip 24ᵇ redeflects the gas into different helical passages offset angularly with respect to the axis of the tube from the first helical passages. At the same time, different portions of the gas are intermixed after the second intercept. The initial part $a$ is split by the leading end portion 28ᵇ into two new parts $c$ and $d$, while the initial part $b$ is split into another two new parts $e$ and $f$. During passage over the second strip 24ᵇ, different portions of the gas stream are then on either side of the strip, this being illustrated by the merger of the arrows representing parts $c$ and $e$. The result of this successive redeflecting and intermixing of the gas is to break up the core of the gas thoroughly and thus prevent hot gas portions from flowing all the way through the tube 11 without ever coming into contact with the tube where efficient heat exchange is possible. At the same time, by continually changing the portions of the gas in contact with the tube 11, the heat is transferred to the tube more evenly over its entire usable length.

I claim as my invention:

1. In a heat exchanger, the combination of, a heat exchanger tube, a plurality of strips each twisted longitudinally to define between its opposite end portions helical passages on opposite sides of each strip, each of said strips being of a substantially uniform width throughout the length thereof corresponding substantially to the internal diameter of said tube, and means for connecting said plurality of strips within said tube to extend axially thereof in contiguous end-to-end relation, the contiguous end portions of said strips extending transversely of the tube across substantially the internal diameter thereof and being angularly displaced relative to each other about the axis of said tube to form angularly displaced intercepting end portions between contiguous strips, whereby gas flowing through said tube is successively intercepted by said angularly displaced end portions and different portions of said gas are deflected along helical paths successively offset angularly one from the next thereby creating turbulence in the gas as it flows through said tube.

2. In a heat exchanger as defined in claim 1 wherein the opposite end portions of each longitudinally twisted strip are disposed substantially at right angles to each other.

3. In a heat exchanger as defined in claim 1 wherein the means for connecting said plurality of strips within said tube comprise interengaging hooks on the contiguous end portions of contiguous strips.

4. In a heat exchanger as defined in claim 3 wherein said interengaging hooks are formed in the contiguous end portions of contiguous strips and interlock with each other and are disposed in intersecting angularly displaced planes including the common axis of the strips.

References Cited in the file of this patent

UNITED STATES PATENTS

| | | |
|---|---|---|
| 1,875,856 | Craver | Sept. 6, 1932 |
| 2,034,822 | Morrow | Mar. 24, 1936 |
| 2,081,612 | Woodson | May 25, 1937 |
| 2,230,221 | Fitch | Feb. 4, 1941 |
| 2,326,716 | Wood | Aug. 10, 1943 |
| 2,462,838 | Brierly | Mar. 1, 1949 |

FOREIGN PATENTS

| | | |
|---|---|---|
| 3,994 | Great Britain | of 1875 |